July 18, 1933.  J. P. BEM  1,918,830
FRUIT HALVING MACHINE
Filed Feb. 20, 1932  2 Sheets-Sheet 1
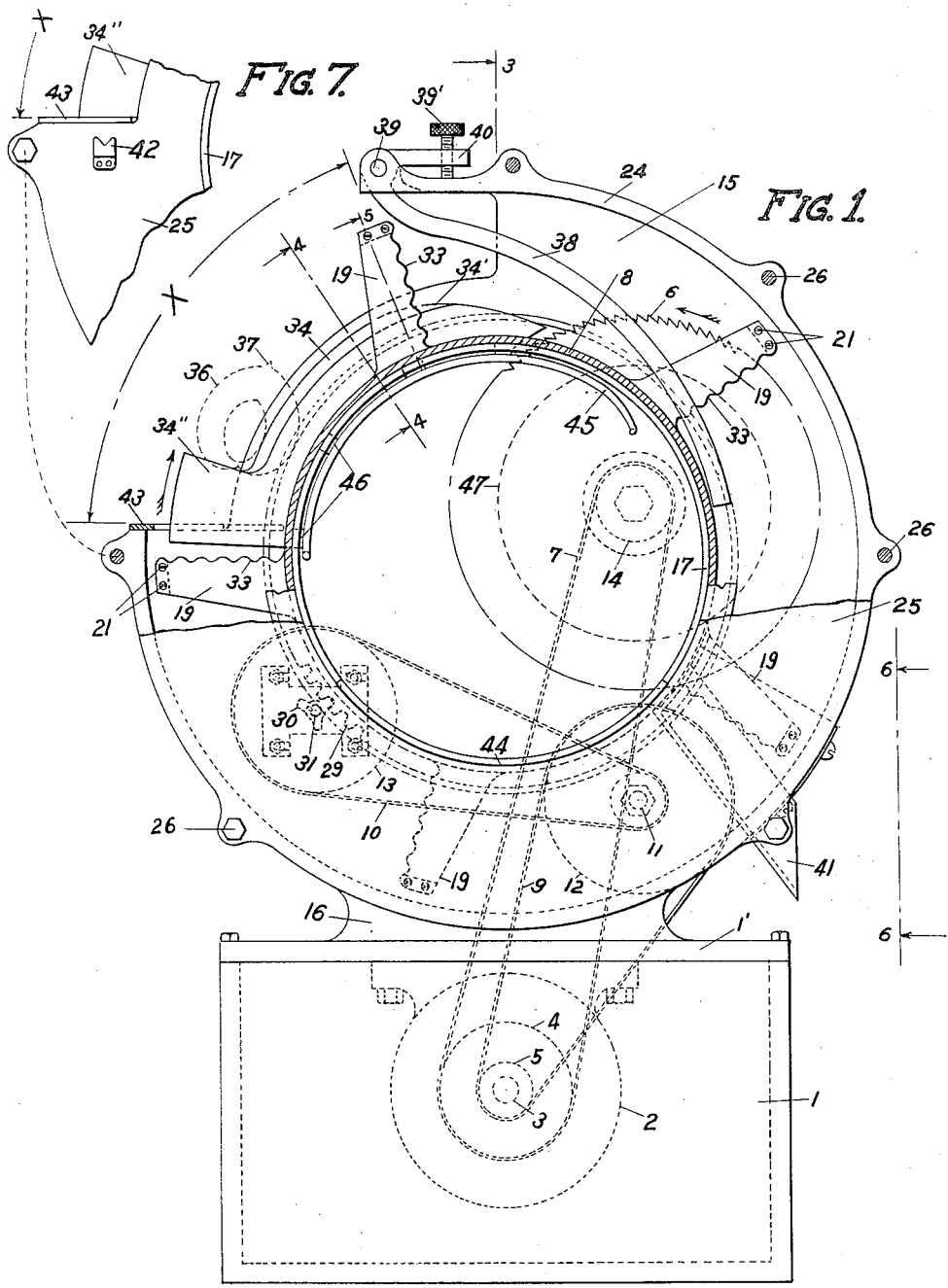
INVENTOR.
JOSEPH P. BEM
BY Miller Boykin & Bried
ATTORNEYS.

July 18, 1933.                J. P. BEM                1,918,830
                         FRUIT HALVING MACHINE
                    Filed Feb. 20, 1932        2 Sheets-Sheet 2
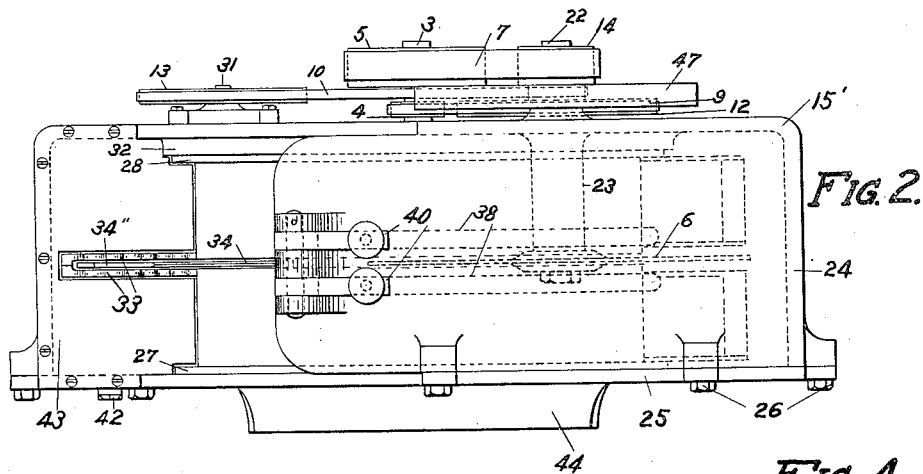
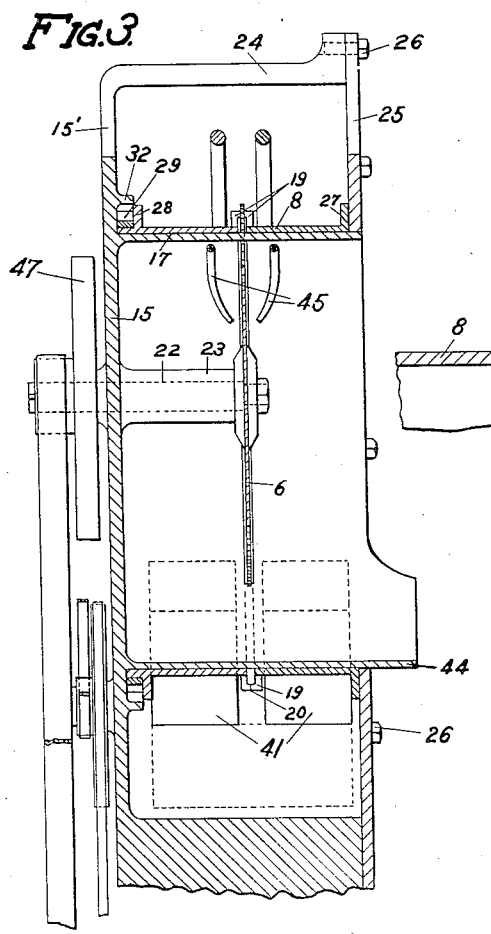
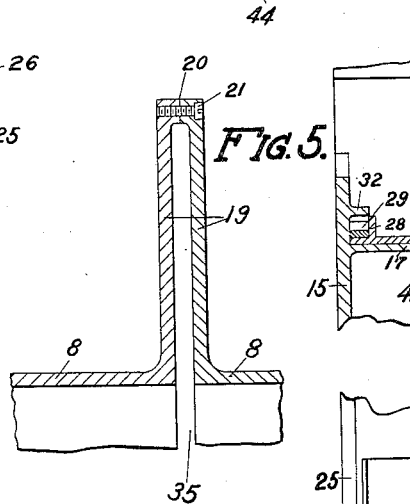
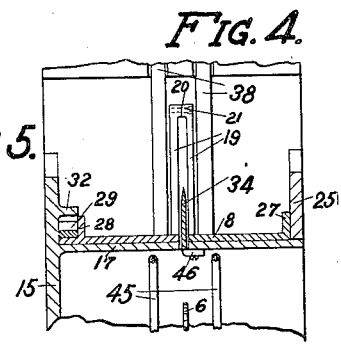
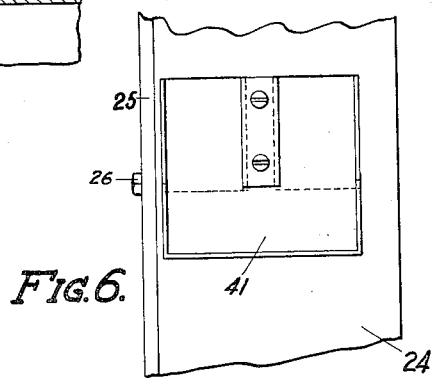
INVENTOR.
JOSEPH P. BEM
BY
*Miller Boykin&Bried*
ATTORNEYS.

Patented July 18, 1933

1,918,830

UNITED STATES PATENT OFFICE

JOSEPH P. BEM, OF OAKLAND, CALIFORNIA, ASSIGNOR TO PACIFIC PITTING MACHINE COMPANY INC., OF FRESNO, CALIFORNIA, A CORPORATION OF CALIFORNIA

FRUIT HALVING MACHINE

Application filed February 20, 1932. Serial No. 594,243.

This invention relates to machines for cutting fruit into halves preparatory to canning or drying, and it has for its objects improvements in and for better operation of a type of such machines as early shown in the patent to Striplin No. 820,150, of May 8, 1906, wherein the peaches are carried along to a circular saw on a blade-like guide positioned in the plane of the saw.

In the drawings accompanying this application Fig. 1 is a side elevation of the machine with front of casing broken away.

Fig. 2 is a plan view of the machine.

Fig. 3 is a vertical section of the upper portion of the machine as seen from the dotted line 3 of Fig. 1.

Fig. 4 is a sectional view of part of the machine as seen from the line 4—4 of Fig. 1.

Fig. 5 is an enlarged sectional view of a portion of the machine as seen from the dotted line 5 of Fig. 1.

Fig. 6 is a view of the discharge end of the machine as seen from the line 6—6 of Fig. 1.

The machine has been designed particularly for halving peaches, but will work on other fruits or vegetables, and to make the detailed description more easily understood attention is called to the fact that in the type of machine shown in the Striplin patent above mentioned which was also for halving peaches, the fruit was first impaled on the edge of a blade-like guide positioned in the plane of a circular saw, and after impaling was moved along the guide and into engagement with the circular saw which then completed the cut through the flesh of the peach. This early machine had a blade-like guide in the plane of the saw both above and below the peach, and the saw was ordinarily not revolved fast enough to cut the pit itself in half but only enough to detach the fruit from the pit. This guiding blade in the plane of the saw idea was followed in Patent No. 1,329,755 to Dunkley, issued February 3, 1920, wherein upper and lower guiding blades were similarly used in the plane of a circular saw but the saw was permitted to saw the pit in half as well, this latter disclosure differing from the earlier in certain details such as in thickening the leading edges of his blade-like guides and in the manner of feeding the peaches along to the saw while impaled on the guides. In my improved machine I am able to use but one blade-like guide leading to the saw, and I provide a revolving member or feeder which carries the peaches successively along the guide to the saw, and while Striplin shows two forms of revolving feeder for carrying the fruit to the saw, my feeder is of simpler construction, positive in operation, and provides for easier feeding and aligning of the fruit to the guide.

In the drawings my machine is shown as provided with a hollow box-like base 1 against the under side of the cover 1' of which is mounted an electric motor 2 with its shaft 3 projecting outward beyond the side wall of the box and there fitted with two pulleys 4 and 5, the first for driving the circular saw 6 by means of belt 7 passing around saw pulley 14 and the other for driving the revolving drum or carrier 8 of the machine by speed reduction belts 9 and 10 through an intermediate or countershaft 11 and pulleys 5, 12 and 13.

The frame proper of the machine is a vertically positioned disk-like member 15 connected to the cover of the box-like base by a web 16 either cast or bolted thereto. This disk is formed with a forwardly extending open front circular member 17 which is in fact a large hollow hub to revolvably support on its outer surface the revolvable drum 8 which is circumferentially slotted clear around so that it may be revolved with the stationarily mounted revolving circular saw 6 free to operate in the slot.

The revolving drum will thus be seen to be in two halves, and these halves are connected together by several (five being shown) lugs or yokes 19 (see Fig. 5) which may be integrally cast with the drum halves, or separately bolted or welded to the drum halves, or parted at their outer ends at 20 and there bolted together as with bolts 21 so as to close the yokes at the outer ends while preserving them free to pass over the saw when the drum revolves.

The disk-like frame member 15 is provided with hubs to support the pulley and saw axles, the latter being indicated at 22 and its supporting hub 23, and it also extends outwardly as at 15' and then forwardly as at 24 over the saw and has a front ring or flange 25 bolted to it at 26 to form a circular forward guide to hold the revolving drum 8 in place as well as to entirely enclose the saw to guard against this danger, as well as danger from the revolving lugs or yokes 19.

Drum 8 has flanges 27, 28 at opposite ends and a ring gear 29 secured to it just alongside flange 28, and which gear is driven by a three-toothed pinion 30 mounted on shaft 31 extending from pulley 13. There is also a flange 32 projecting from frame member 15 covering and protecting ring gear 29 against ingress of dirt.

Yokes 19 revolve with the drum in a clockwise direction in Fig. 1 and the saw in a counter-clockwise direction. The legs of the yokes are spaced to just clear the saw and are about a quarter of an inch thick and scolloped along their forward edges as at 33 for a purpose which will be later explained, and positioned within the space between the yoke legs so as to be straddled by the revolving yokes is a stationary blade-like guide 34 which is secured to the inner surface of the fixed hub 17 as at 46 and projects radially through the slot 35 in the drum outwardly about 1½ inches. This blade is in length about equal to one-third the circumference of the drum and for a distance leading to the saw is concentric with the drum, then from a point about as at 34' slants inwardly toward the drum and terminates about a half inch above the drum at a point adjacent the saw. The opposite end of the blade is formed as at 34" to project outward or radially to about the limit of height which will pass under the yokes and is provided with a blunt edge, whereas the circular portion 34 of the blade is sharpened on its outer edge to the point 34' and then is blunt to the end.

For the distance X as shown on Fig. 1 a gap is formed in the frame disk, covering ring 24 and flange 25 to form an operating space for the insertion of the fruit, and when operating on peaches (36) they are pushed down one at a time upon the circular blade 34 with the bloom tip ends 37 pointing in direction of the saw and the suture at the stem end aligned against the radial portion 34" of the blade so as to insure the saw cutting the pit in half along the line of its greatest diameter as required in canning peaches.

When the peach is in place on the guiding blade the first yoke coming along on the rather slowly revolving drum will carry it along the guide and push it past the saw, and as it approaches the saw it will be engaged from above on both sides of the saw by independently swinging arms 38 of round metal each pivoted at 39 on the machine frame and slanting downwardly toward but just clearing the drum on opposite sides of the saw, in a manner so that the advancing peach will ride under them and by their weight (or aided by a spring if desired) will be pushed downwardly on the inwardly slanted end of the blade so as to contact the drum and be held against it while being sawed.

The serrated or scolloped edges 33 of the yokes cooperate with the arms 38 in preventing the peach from rotating as it is engaged by the saw.

Arms 38 may be independently adjusted to limit their inward swinging movement through the provision of thumb screws 39' working through forwardly extending lugs 40 on the pivoted hubs or ends of the arms.

As the peaches are cut in half one by one as carried past the saw by the yokes the halves fall to either side and pass out of a chute 41. This chute is centrally slotted at its bottom to pass the yokes as they revolve, and is positioned at such a point after the saw so that one yoke will be entering its slot just as the peach carried by the next oncoming yoke is halved by the saw and this prevents any possibility of one of the fruit halves lodging in this slot, although they naturally fall outwardly.

In halving peaches it is generally required that the bloom tip 37 of the fruit be cut off, and to this end I provide a small V-shaped knife on the right-hand side of the machine adjacent the point where the operator inserts the peaches. This knife is shown at 42 in Fig. 7 as attached to and projecting outwardly from flange 25 at the beginning of the frame gap X and the operator merely passes the tip of the peach across this knife with a continuous motion on its way to be placed on the receiving blade 34. The portion of the machine shown in Fig. 7 is a piece of the side flange 25 at the beginning of the gap referred to, and the dotted line connecting one of the bolts of Fig. 1 with the bolt of the fragment will show how they go together.

Across the lower end of the gap is a safety closure plate 43 slotted to pass the yokes.

The open front of the hollow hub 17 is formed into a discharge lip 44 for sawdust, and water which is usually dripped onto one or both sides of the saw as from a small branched tube 45 leading from any convenient source of supply.

By the double belt drive from the one motor I am enabled to obtain as increased speed of rotation of the saw over that of the motor, and a much decreased speed on the revolving drum without resorting to worm drives. The speed of the drum is figured to bring about from 40 or 50 yokes per minute past the frame gap, as this is about as fast as peaches can be properly centered and aligned by hand.

When operating on other fruits or vegetables not requiring centering, the machine may be run at a much higher speed. To aid the saw in passing through the hard pits as they come along I provide a small flywheel 47 on the saw arbor 22.

Attention is called to the fact that while I show the sides or legs of the yokes connected at their outer ends for driving both pieces of the split drum, it is manifest that only one or two need be so connected to drive the drum, or if two driving ring gears 29 be used all the yokes can be open at the outer ends.

Attention is also called to the action of the machine as shown in Fig. 1 and wherein it will be seen that by the arrangement of the saw in relation to the carrier the advancing peach is brought into contact with the saw teeth in such a way that the action of the teeth against the pit is always to push the pit away from the saw, or, that is, lift the pit from the teeth instead of tending to drag the pit down into engagement with the saw. This tendency to lift the fruit is prevented by the gravity arms 38. This arrangement overcomes the tendency to jam the pits into the saw teeth and tear the fruit, a common fault of this type of machine working on drupes with hard pits.

In considering the machine as above described it will therefore be seen that many changes in details may be made without departing from the spirit of the invention as expressed in the following claims.

I claim:—

1. A fruit halving machine comprising a power-actuated saw, a movable carrier member passing across the side of the saw, a yoke carried by the carrier member having a leg on both sides of and close to the saw, the yoke legs joined together at their outer ends at a height to pass over the edge of the saw, and a guide for the fruit leading to the saw straddled by said yoke.

3. A fruit halving machine comprising a power-actuated saw, a rotary carrier member passing across the side of the saw, spaced yokes carried by the carrier member each having a leg on both sides of and close to the saw, the yoke legs joined together at their outer ends at a height to pass over the edge of the saw, and a guide for the fruit leading to the saw straddled by said yokes.

3. A fruit halving machine comprising a power-actuated saw, a rotary carrier slotted to pass the saw and passing across opposite sides of said saw, fruit feeding device extending from said carrier arranged to pass adjacent opposite sides of said saw, and a fixed guide for the fruit leading to the saw in the plane of and positioned between said fruit feeding devices and along opposite sides of which guide said devices pass upon operation of the machine.

4. In a fruit halving machine, a power-actuated saw, a moving carrier with a portion lying to either side of said saw and passing thereover provided with spaced fruit-advancing lugs for carrying the fruit into the saw, a blade-like guide for the fruit leading to the saw arranged in the plane of the saw between said lugs, and a pair of independently swinging arms lying close to opposite sides of the saw adapted to hold the fruit down.

5. In a fruit halving machine, a power circular saw, a revolvable drum slotted peripherally and mounted to pass adjacent both sides of said saw the axis of said saw located within the drum and the saw projecting outwardly through the slot, fruit-advancing lugs projecting from said drum on opposite sides of said saw, and a fixed fruit guiding blade positioned in the plane of said saw straddled by said lugs.

6. In a fruit halving machine, a power saw, a revolvable drum slotted peripherally and mounted to pass adjacent both sides of said saw, fruit-advancing lugs projecting from said drum on opposite sides of said saw, and a fixed fruit guiding blade positioned in the plane of said saw straddled by said lugs, said blade provided with a substantially right-angle shoulder at the fruit-receiving position for aligning of the fruit in placing it on the guide.

7. In a fruit halving machine, a power saw, a revolvable drum slotted peripherally and mounted to pass adjacent both sides of said saw, fruit-advancing lugs projecting from said drum on opposite sides of said saw, and a fixed fruit guiding blade positioned in the plane of said saw straddled by said lugs, said blade projecting through the slot of the drum to a point above the same a distance to impale the flesh of a drupe substantially to the pit, and tapering to a lesser projection as it nears the saw.

8. A fruit halving machine comprising a peripherally slotted drum, means mounting said drum for rotation on a horizontal axis, a circular saw mounted to operate on a fixed axis lying within the drum with the saw projecting outward through the slot of said drum, fruit-advancing yokes spaced around said drum each having a leg disposed on both sides of the slot and saw, said yokes of a height to pass over and clear the saw.

9. A fruit halving machine comprising a peripherally slotted drum, means mounting said drum for rotation on a horizontal axis, a circular saw fixedly mounted to operate in the slot of said drum, fruit-advancing yokes spaced around said drum each having a leg disposed on both sides of the slot and saw, said yokes of a height to pass over and clear the saw, and a blade-like guide for the fruit fixedly positioned between the legs of said yokes in the plane of the saw.

10. In a structure as specified in claim 9, a casing surrounding said drum, saw and revolving yokes, provided with an open gap for the feeding of fruit to the guide.

11. A fruit halving machine comprising a peripherally slotted drum, a supporting frame provided with a cylindrical hub on which said drum is mounted for rotation, a circular saw mounted on the frame projecting through a slot in said hub and the slot of said drum and outwardly beyond the drum a distance to cut in half fruit carried around on the exterior of the drum, and means spaced around said drum for carrying fruit into the saw.

12. A fruit halving machine comprising a peripherally slotted drum, a supporting frame provided with a cylindrical hub on which said drum is mounted for rotation, a circular saw mounted on the frame projecting through a slot in said hub and the slot of said drum and outwardly beyond the drum a distance to cut in half fruit carried around on the exterior of the drum, yokes spaced around said drum for carrying fruit into the saw, and means adapted to resiliently hold the fruit down toward the drum.

13. A fruit halving machine comprising a peripherally slotted drum, a supporting frame provided with a cylindrical hub on which said drum is mounted for rotation, a circular saw mounted on the frame projecting through a slot in said hub and the slot of said drum and outwardly beyond the drum a distance to cut in half fruit carried around on the exterior of the drum, yokes spaced around said drum for carrying fruit into the saw, a blade-like guide for the fruit positioned between the legs of the yokes in the plane of the saw extending through the slot of the drum and secured to said hub.

14. In a structure as specified in claim 9, a casing surrounding said drum, saw and revolving yokes, provided with an open gap for the feeding of fruit to the guide, and a tip cutting knife mounted on the casing adjacent the edge of the gap.

15. In a fruit halving machine, a power-actuated saw, a flat blade-like guide fixed in the plane of the saw leading thereto and adapted for the impaling of a fruit thereon for sliding therealong to the saw, and an elbow in the plane of the blade at the outer end thereof projecting substantially at right angles to the edge of the blade where the fruit is placed upon it, said elbow having a space in front of it to permit the fruit being freely manipulated and aligned with its suture against said elbow preparatory to forcing into impalement with said blade.

16. In a peach bisecting machine, a circular saw, an impaling blade in line with said saw, means for pushing whole peaches one after another along said blade into engagement with and by the saw for bisecting both flesh and pits of the peaches, the angle of the path of travel of the peaches in relation to the direction of rotation of the saw during the sawing of the pits being such as to tend to push the pits away from the saw teeth, and means resiliently holding the peaches against this action of the teeth.

JOSEPH P. BEM.